May 14, 1929.  E. A. ARNDT  1,713,159
AUTOMOBILE TRUNK PLATFORM
Filed Nov. 14, 1927
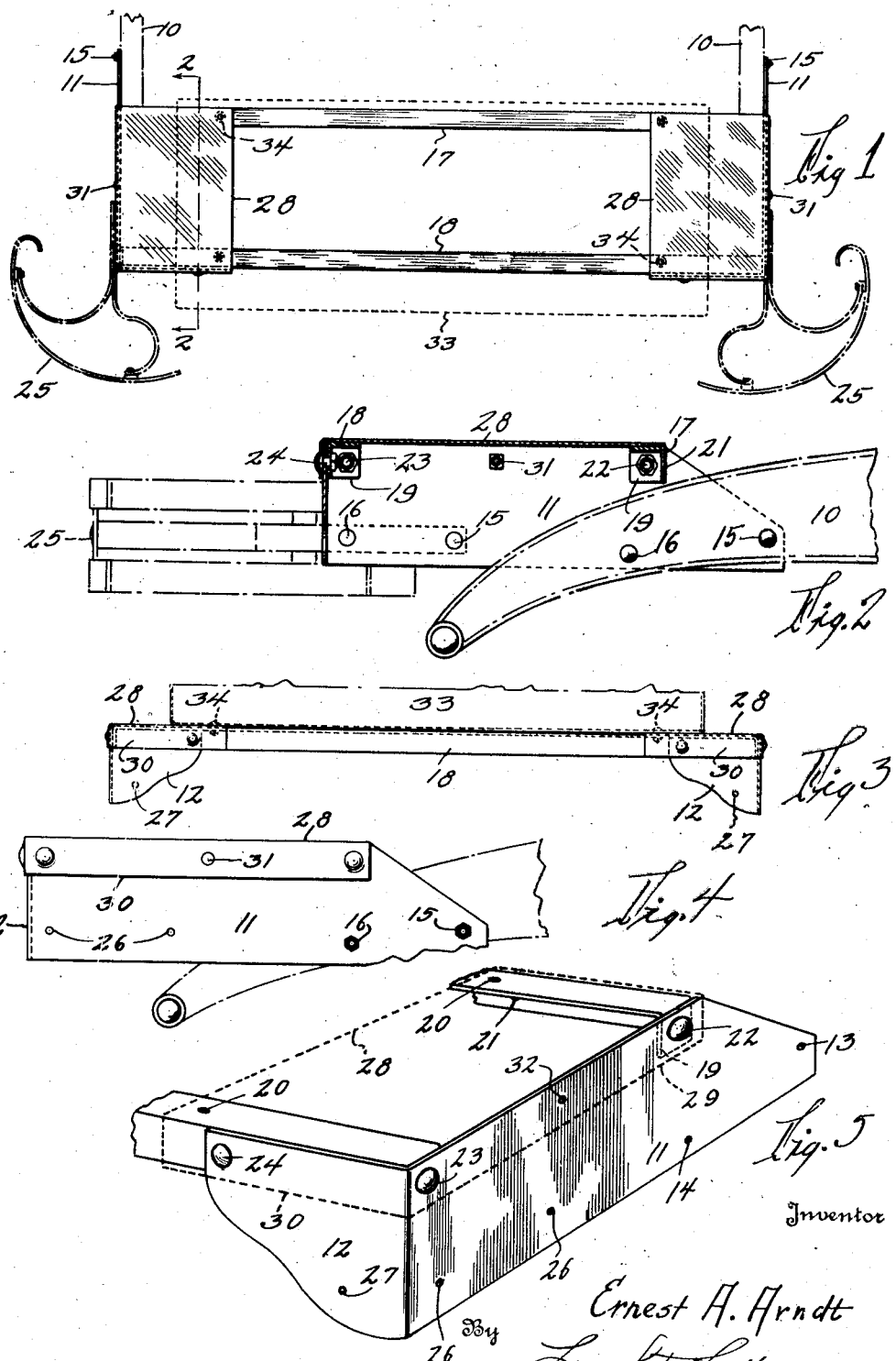
Inventor
Ernest A. Arndt
By Lynn H. Latta
Attorney Patented May 14, 1929.

1,713,159

UNITED STATES PATENT OFFICE.

ERNEST A. ARNDT, OF SIOUX CITY, IOWA, ASSIGNOR TO KARI-KEEN MANUFACTURING COMPANY, OF SIOUX CITY, IOWA.

AUTOMOBILE TRUNK PLATFORM.

Application filed November 14, 1927. Serial No. 233,083.

My invention relates to automobile trunk platforms and has for its general object to provide a supporting device for an automobile trunk, attachable to the chassis members of a vehicle near the rear ends of said members.

Heretofore it has been found necessary to design different types of platforms for different makes of vehicles. The reason for this necessity arises partly from the different widths between the chassis members of the various makes of vehicles and partly from the fact that most vehicles are equipped with rear side bumpers, or bumperettes, as they are called, which bumperettes are attached in numerous ways by a large number of bracket devices of various types and in order to design a platform which would not interfere with the various types of bumperettes, it has been necessary to vary the design an indefinite number of times.

The installation of a trunk platform has thus been complicated by the presence of bumperettes.

It is my purpose to provide a trunk platform which is so constructed that all parts of the platform, save a pair of transverse cross bars, may be made identical in construction for all makes of vehicles. The cross bars just referred to are of such construction that the only variation in their manufacture lies in the length to which they are cut.

All trunk platforms are longer than the trunks which they support. In order to give a finished appearance to such a platform, it has been considered essential from the standpoint of marketability to provide not merely an open framework, but a platform which is entirely covered across the top. Such a top covering would ordinarily have to be made in various sizes to fit the various sizes of platforms. My invention solves the problem of providing a universal construction by constructing the framework of the platform strong enough to resist not only the weight of the trunk but all side sway as well and the covering of the platform is performed by means of a pair of caps which may be of relatively light material and which project toward each other sufficiently to be overlapped by the ends of any standard size trunk when placed on any standard sized vehicle.

My invention attains the proper strength in the frame of the platform without the aid of the covering element and without sacrificing the feature of universal adjustability and identity of elements in all sizes of platforms before mentioned.

A further object of my invention is to provide a platform in which the frame construction is not only strong enough to resist the normal side sway and weight of a trunk, but also to support the bumperettes. By making it possible to attach the bumperettes directly to the platform, the problem of building the platform around the bumperettes is entirely eliminated.

My invention also contemplates a structure, to which any of the many numerous types of bumper brackets now on the market, may be attached.

My invention further contemplates a platform having the features of strength and universal applicability already mentioned and yet which may be readily installed by any purchaser of a trunk.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a plan view of a platform constructed in accordance with my invention attached to the chassis members of a vehicle, (shown in broken lines) and carrying a pair of bumperettes, (shown in broken lines), the position of a trunk which would be supported upon the platform being indicated by dotted lines.

Fig. 2 is a transverse, sectional view, taken on the line 2—2 of Fig. 1, the chassis member and bumperette being shown in broken lines.

Fig. 3 is a rear elevation of the platform supporting a trunk which is shown in broken lines.

Fig. 4 is a side elevation of the platform, the vehicle chassis member being shown in broken lines.

Fig. 5 is a perspective view of one side of the platform, the cap being merely indicated in dotted lines.

I have used the reference character 10 in each of the figures to indicate the two chassis members which project rearwardly from the ordinary vehicle in a generally downwardly inclined direction.

My invention provides a pair of L shaped brackets illustrated in a perspective in Fig. 5, each formed of heavy sheet steel or other material having the proper strength and each including a side wall 11 and an end wall 12. The side wall 11 is provided with a pair of openings 13 and 14, which are positioned near the lower edge of the side wall in order that the latter may project substantially above the chassis member to which it is attached. Bolts 15 and 16 are extended through the openings 13 and 14 and through the side wall of the chassis member in order to secure the brackets to the latter.

The framework of the platform is completed by a pair of angle iron cross bars 17 and 18, which are identical in construction in any particular platform. For varying sizes of platforms, the angle irons are cut in varying lengths. One wall of each cross bar is bent to a perpendicular position to form an end wall 19, (see Fig. 2), and openings 20 and 21 are provided in the respective walls of the cross bars. The openings 20 are spaced equidistantly from each other and the openings 21 are likewise spaced equidistantly from the ends of the cross bars in all cases. The purpose of the openings 20 is to receive the bolts which secure the trunk to the platform and the purpose of the openings 21 is to receive the bolts which secure the end walls 12 of the brackets to the rear cross bar. The openings 21 in the forward cross bar are not utilized. An opening, (not shown), is provided in the end wall 19 at each end of each cross bar for the purpose of receiving bolts for securing the cross bars to the side walls 11 of the brackets.

It will now be seen that the cross bars are identical in construction with the exception of length and positioning of openings 20. The rear cross bar is reversed end to end, relative to the forward cross bar from a position where its parts register with those of the forward cross bar to its proper position in the assembled platform.

The distance of the openings 21, respectively, from the ends of the cross bars is the same in all cases and the forming of the ends of the cross bars in all cases may be done in the same die. Consequently the only variation in the manufacture of the cross bars is in the cutting to the proper length.

By providing cross bars which are identical for a particular size platform, the assembling of the platform is made easier. It will thus be impossible for the person who assembles the platform to get the cross bars reversed relative to each other and his only care need be to see that the openings 20 are at the top and the openings 21 at the sides of the respective cross bars.

In assembling, the brackets are first attached to the chassis members of the vehicle. The cross bars are then placed between the brackets and bolts 22 and 23, respectively, extended through openings, properly positioned in the side walls 11, and through the end walls 19 of the cross bars in order to secure the latter in place. Bolts 24 are then extended through openings provided for them in the end walls 12, near the ends thereof, and through the openings 21 of the crossbars.

It may be stated at this point that the strength and rigidity of the platform frame is attained primarily through the use of the integral L shaped bracket construction and the attaching of the rear cross bar 18 to the bracket at points substantially spaced apart in the length of the cross bar. The forward cross bar aids somewhat in strengthening the structure, but its primary purpose is to support the forward side of the trunk. The rear cross bar and bracket connection forms a rigid structure which will withstand side sway and also the shocks to which a bumper is subjected. At the same time, the L shaped bracket construction and cross bar connection provide a very simple method of assembling the platform, as has already been pointed out.

The frame of the platform having been assembled, the bumperettes, which are indicated generally in Figs. 1 and 2 by the reference character 25, may be next attached. For this purpose, it will ordinarily be necessary to drill openings in either the side wall 11 or the end wall 12 or in both since bumper brackets are provided, some of which attach solely to the side walls of vehicle chassis members, some of which attach solely to some transverse portion of the vehicle frame and some of which attach both to the side walls and the transverse portions of the vehicle frame. I have shown, for the purpose of illustration, a series of openings 26 in the side wall 11 of a bracket and an opening 27 in the end wall 12 and in actual practice, the brackets are provided at the factory with some such series of openings to accommodate the most common of the standard bumperette brackets.

It may be noted that the L shaped bracket construction not only serves to produce a very rigid structure in which the rigidity does not depend on the top covering member but also to enable the attachment of any of the bumper brackets, now found on the market, to the platform itself, rather than to the frame of the vehicle.

Before attaching the trunk, the upper covering elements, which I designate as caps, and which in the accompanying drawings, are indicated by the reference numeral 28, are attached. These caps may be made of very light sheet metal, due to the fact that they are not essential to the strength of the structure and thus a very substantial saving in material is made possible. This saving in material is further accentuated by the fact that the caps do not cover the entire platform but are only wide enough to extend under the trunk in the installation of a platform on any width vehicle. Each cap includes a side flange 29 and a rear flange 30, which are preferably of the same width as the vertical wall of the cross bar 18. (See Fig. 3.) Thus the appearance of a continuous covering is simulated. The flanges 29 and 30 serve to position the cap properly on the frame of the platform and a single stove bolt 31 is employed to temporarily secure the caps in place, the stove bolt 31 being extended through the flange 29 and through an opening 32, which is provided for it in the side wall 11.

The caps being temporarily held in place, the trunk 33 is then secured upon the platform by means of bolts 34, extended through openings provided for them in the trunk and through the openings 20. The caps being of thin material, openings in the caps to accommodate the bolts may be provided in a simple manner by placing the trunk in its proper position and merely punching the holes through the caps by means of a suitable punch. Since the distance of the openings from the end of the platform varies according to the length of the platform, and the width of the vehicle, the openings cannot be provided in the caps in advance without requiring the manufacture of a large number of varieties of caps for particular installations. By leaving the caps to be punched during installation, the only members of the platform which need to be provided especially for each type of vehicle are the cross bars. The distance which the caps project under the trunk will vary according to the length of the platform, being greater for an interior platform and longer for a longer platform, but since the caps are, in all cases, covered by the trunk, the effect to the eye will be the same. After the trunk has been attached, the caps are securely held in place by the trunk bolts and the trunk itself. Although the trunk contacts directly with the caps, only the actual weight of the trunk is supported by the cross bars.

The platform shown in the accompanying drawing is intended for use partly with the combined trunk and luggage carrier of my Reissue Patent, #16,665, but it will be understood that such a platform will be equally adaptable for supporting trunks of other types and it is therefore my purpose to cover by my claims a platform per se, having the advantageous features of construction comprising my invention for the purpose of attachment to vehicles and for supporting trunks in general.

I claim:

1. In a trunk platform, a pair of pressed sheet metal L-shaped brackets, each having a vertical side wall and a vertical end wall joined integrally with the side wall to form a corner, the side walls being attachable to the chassis members of a vehicle, a rear cross bar secured to the brackets at points near the corners thereof, and to the end walls at points spaced longitudinally of the cross bar from said first-mentioned points.

2. In a trunk platform, an open, rectangular frame adapted to be secured to the chassis of a vehicle, and a pair of caps of relatively light material covering the space between the ends of a trunk resting upon the frame, and the ends of the frame, said caps being held securely in place by connections securing the trunk to the platform, said connections passing through the caps.

3. In a trunk platform, an open rectangular frame adapted to be secured to the chassis of a vehicle, and a pair of caps covering the space between the ends of a trunk resting upon the frame, and the ends of the frame, means securing the outer extremities of said caps to the frame, the inner extremities thereof being held securely in place by the trunk, the trunk resting upon said inner extremities.

4. In a trunk platform, a pair of pressed sheet metal L-shaped brackets, each having a vertical side wall and a vertical end wall joined integrally with the side wall to form a corner, the side walls being attachable to the chassis members of a vehicle, a rear cross bar, L-shaped in cross section and having a portion of its wall near each end bent at right angles to form ears, securing elements extended through said ears and the side walls of the brackets and securing elements extended through the end walls and through the rear cross bar side wall at points spaced longitudinally of said rear cross bar from said first-mentioned securing elements.

5. In a trunk platform, a pair of pressed sheet metal L-shaped brackets, each having a vertical side wall and a vertical end wall joined integrally with the side wall to form a corner, the side walls being attachable to the chassis members of a vehicle, a rear cross bar, L-shaped in cross section and having a portion of its wall near each end bent at right angles to form ears, securing elements extended through said ears and the side walls of the brackets, securing elements extended through the end walls and through the rear cross bar side wall at points spaced longitudinally of said rear cross bar from said first-mentioned securing elements, and a forward cross bar having a portion of its wall near each end bent at right angles to form end walls, said last-mentioned end walls being secured to the side walls of the brackets.

Signed this 9th day of November, 1927, in the county of Woodbury and State of Iowa.

ERNEST A. ARNDT.